United States Patent
Cadix et al.

(10) Patent No.: US 10,774,258 B2
(45) Date of Patent: Sep. 15, 2020

(54) SEQUENCED POLYMERS FOR MONITORING THE FILTRATE

(71) Applicant: RHODIA OPERATIONS, Paris (FR)

(72) Inventors: Arnaud Cadix, Saint-Ouen (FR); David James Wilson, Coye la Forêt (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/564,801

(22) PCT Filed: Apr. 6, 2016

(86) PCT No.: PCT/EP2016/057547
§ 371 (c)(1),
(2) Date: Oct. 6, 2017

(87) PCT Pub. No.: WO2016/162388
PCT Pub. Date: Oct. 13, 2016

(65) Prior Publication Data
US 2018/0105731 A1    Apr. 19, 2018

(30) Foreign Application Priority Data
Apr. 7, 2015   (FR) ...................... 15 00699

(51) Int. Cl.
| | | |
|---|---|---|
| *C09K 8/76* | (2006.01) | |
| *C09K 8/46* | (2006.01) | |
| *C08F 261/04* | (2006.01) | |
| *C08F 291/00* | (2006.01) | |
| *C08F 293/00* | (2006.01) | |
| *C08B 37/00* | (2006.01) | |

(52) U.S. Cl.
CPC ............. *C09K 8/46* (2013.01); *C08F 261/04* (2013.01); *C08F 291/00* (2013.01); *C08F 293/005* (2013.01); *C08B 37/00* (2013.01); *C08F 2438/03* (2013.01)

(58) Field of Classification Search
CPC .......... C09K 8/68; C09K 8/588; C09K 8/584; C09K 8/685; C09K 8/74; C09K 2208/30; C09K 8/035; C09K 8/88; C09K 8/882; C09K 2208/00; C09K 2208/08; C09K 8/44; C09K 8/602; C09K 8/70; C09K 8/725; C09K 8/887; C09K 2208/12; C09K 2208/26; C09K 2208/32; C09K 8/12; C09K 8/487; C09K 8/508; C09K 8/5083; C09K 8/665; C09K 8/80; C09K 8/86; C09K 8/76; C09K 3/00; C09K 17/22; C09K 17/14; C09K 17/18; C09K 17/38; C09K 17/52; C09K 3/1409; C09K 3/1463; C09K 8/605; C09K 17/40; C09K 17/48; C09K 17/50; C09K 8/04; C09K 8/36; C09K 8/64

See application file for complete search history.

(56) References Cited

U.S. PATENT DOCUMENTS

| | | | |
|---|---|---|---|
| 8,865,840 B2 * | 10/2014 | Gonzalez Montiel | .... C08F 2/38 525/294 |
| 2012/0077928 A1 * | 3/2012 | Destarac | ................... C08F 2/38 524/533 |

FOREIGN PATENT DOCUMENTS

| | | |
|---|---|---|
| EP | 2607101 A1 | 6/2013 |
| FR | 2986005 A1 | 7/2013 |
| WO | 200800766 A2 | 1/2008 |

* cited by examiner

*Primary Examiner* — Kumar R Bhushan

(57) ABSTRACT

The invention relates to a method for preparing a sequenced copolymer comprising a first block (A) connected to a second block (B), said method comprising the following steps of monitored radical polymerisation: (E1) bringing into contact, typically in an aqueous medium: unsaturated ethylene monomers $m_A$, selected in order to constitute the block (A); a source of free radicals; and an agent for monitoring the radical polymerisation; and then (E2) bringing into contact: the polymer obtained from step (E1); unsaturated ethylene monomers $m_B$; a source of free radicals; and a polymer $P^0$ which is not ethylenically unsaturated and supports labile hydrogens.

12 Claims, No Drawings

SEQUENCED POLYMERS FOR MONITORING THE FILTRATE

This application is a U.S. national phase entry under 35 U.S.C. § 371 of International Application No. PCT/EP2016/057547, filed on Apr. 6, 2016, which claims priority to French Application No. 15/00699, filed on Apr. 7, 2015. The entire contents of these applications are incorporated herein by this reference.

The present invention relates to the field of oil extraction. More specifically, it relates to agents providing an effect of controlling fluid loss in fluids injected under pressure into subterranean formations.

In the field of oil extraction, numerous stages are carried out by injecting fluids under pressure within subterranean formations. In the present description, the notion of "subterranean formation" is understood in its broadest sense and includes both a rock containing hydrocarbons, in particular oil, and the various rock layers traversed in order to access this oil-bearing rock and to ensure the extraction of the hydrocarbons. Within the meaning of the present description, the notion of "rock" is used to denote any type of constituent material of a solid subterranean formation, whether or not the material constituting it is strictly speaking a rock. Thus, in particular, the expression "oil-bearing rock" is employed here as synonym for "oil-bearing reservoir" and denotes any subterranean formation containing hydrocarbons, in particular oil, whatever the nature of the material containing these hydrocarbons (rock or sand, for example).

Mention may in particular be made, among the fluids injected under pressure into subterranean formations, of the various fluids for completion and workover of the wells, in particular drilling fluids, whether they are used to access the oil-bearing rock or else to drill the reservoir itself (drill-in), or else fracturing fluids, or alternatively completion fluids, control or workover fluids or annular fluids or packer fluids.

A specific case is that of oil cement grouts, which are employed for the cementing of the annulus of oil wells according to a method well-known per se, for example described in Le Forage [Drilling] by J. P Nguyen (Editions Technip 1993). These oil cement grouts are injected under pressure within a metal casing introduced into the drilling hole of the oil wells, then rise again, under the effect of the pressure, via the "annulus" space located between the casing and the drilling hole, and then set and harden in this annulus, thus ensuring the stability of the well during drilling.

Within an oil extraction well, bringing the fluid under pressure into contact with the subterranean formation (which generally exhibits a more or less high porosity, indeed even cracks) induces a "fluid loss" effect: the liquid present in the fluid has a tendency to penetrate into the constituent rock of the subterranean formation, which can damage the well, indeed even harm its integrity. When these fluids employed under pressure contain insoluble compounds (which is very often the case, in particular for oil cement grouts or else drilling or fracturing fluids comprising polymers), the effect of fluid loss at the same time brings about a concentration of the fluid, which can result in an increase in viscosity, which affects the mobility of the fluid.

In the specific case of a cement grout, the fluid loss can in addition result in excessively rapid setting of the cement, before the space of the annulus is cemented, which can, inter alia, weaken the structure of the well and harm its leaktightness.

For further details relating to the effect of fluid loss and its cementing effects, reference may in particular be made to Well Cementing, E. B. Nelson (Elsevier, 1990).

For the purpose of inhibiting the phenomenon of fluid loss, a number of additives have been described which make it possible to limit (indeed even in some cases completely prevent) the escape of the liquid present in the fluid toward the rock with which it comes into contact. These additives, known as "fluid loss control agents", generally make it possible to obtain, in parallel, an effect of control of the migration of gases, namely isolation of the fluid with respect to the gases present in the rock (gases which it is advisable to prevent from penetrating into the fluid, in particular in the case of cement grouts, these gases having a tendency to weaken the cement during setting).

Various fluid loss control agents of the abovementioned type have been provided, which include in particular cellulose derivatives (for example hydroxyethylcellulose) or alternatively AMPS-based copolymers, such as those described, for example, in U.S. Pat. No. 4,632,186 or 4,515,635. These additives are not always fully suitable for providing, in practice, effective limitation of fluid loss. In particular, and this is especially the case in the field of oil cement grouts, the presence of other additives can inhibit the effect of the agents employed for providing control of fluid loss. In particular, in the presence of some dispersing agents or set retarders, the abovementioned fluid loss control agents generally experience a deterioration in their properties.

An aim of the present invention is to provide novel fluid loss control agents for fluids injected under pressure into subterranean formations which are well-suited in practice.

To this end, the present invention provides a route of access to specific block copolymers, which are capable of providing a fluid loss control effect when they are employed with particles, with which they combine, it being possible for these particles to be particles present within the subterranean formation; and/or cement particles in the case of a fluid employed in cementing; and/or particles injected within subterranean formations with the copolymers.

More specifically, according to a first aspect, a subject matter of the present invention is a process for the preparation of a block copolymer P comprising a first block (A) bonded to a second block (B), appropriate, inter alia, for the preparation of block copolymers of use as fluid loss control agent, and which comprises the following controlled radical polymerization stages:

(E1) the following are brought into contact, typically in an aqueous medium:
  ethylenically unsaturated monomers $m_A$, which are identical or different, chosen for the construction of the block (A);
  a source of free radicals which is suitable for the polymerization of said monomers; and
  a control agent for the radical polymerization, preferably comprising a thiocarbonylthio —S(C=S)— group; then (E2) the following are brought into contact:
  the polymer obtained on conclusion of stage (E1), which acts as control agent for the radical polymerization;
  ethylenically unsaturated monomers $m_B$, which are identical or different, chosen for the construction of the block (B);
  a source of free radicals which is suitable for the polymerization of said monomers; and
  a polymer $P^0$ which is not ethylenically unsaturated and which carries labile hydrogens.

The term "labile hydrogen" is understood to mean, within the meaning of the present description, a hydrogen atom capable of being torn off by homolytic cleavage during a radical polymerization reaction (in contrast, for example, to an acid proton). Typically, this hydrogen atom is torn off by a primary or propagation radical, the departure of this hydrogen resulting in the formation of a radical.

The preparation process of the present invention, including stages (E1) and (E2), is a process for the synthesis of two successive polymer blocks by the well-known controlled radical polymerization technique but where the synthesis of the second block (block B) is specifically carried out in the presence of a polymer carrying labile hydrogens in addition to the ethylenically unsaturated monomers, whereby, schematically, at least a portion of the polymer $P^0$ carrying labile hydrogens is grafted to the block B during its synthesis.

According to another aspect, a subject matter of the invention is the block polymers of the type which are obtained according to the abovementioned process. In this context, a subject matter of the invention is in particular some of the polymers obtained (or capable of being obtained) by the abovementioned process and which comprise:
- as a first block (A), a block known as "short block", with a weight-average molecular weight typically of less than 30 000 g/mol; and
- a second block (B) also known as "long block" hereinafter, with a composition distinct from that of said first block and with a weight-average molecular weight of greater than 10 000 g/mol, for example greater than 100 000 g/mol, and which incorporates at least a portion of the polymer $P^0$ and which is soluble in the fluid (F).

According to yet another more specific aspect, a subject matter of the present invention is the use, as fluid loss control agent in a fluid (F) injected under pressure into a subterranean formation,
where said fluid (F) comprises solid particles (p) and/or is brought into contact with solid particles (p) within the subterranean formation subsequent to its injection,
of a block polymer (P) of the type obtained according to the abovementioned stages (E1) and (E2) and comprising:
- a first block (A), known as "short block", with a weight-average molecular weight typically of less than 30 000 g/mol, which is adsorbed, preferably irreversibly, on at least a portion of the particles (p); and
- a second block (B), known as "long block", with a composition distinct from that of said first block and with a weight-average molecular weight of greater than 10 000 g/mol, for example of greater than 100 000 g/mol, and which is soluble in the fluid (F), and which incorporates at least a portion of the polymer $P^0$.

According to another aspect, a subject matter of the present invention is the fluids for injection under pressure within an oil-bearing rock or a drilling well comprising the specific block polymers of the type which are mentioned above and also the blends for the preparation of these fluids comprising these polymers in combination with particles (p).

The specific polymers obtained in the context of the present invention, due to the presence of the two specific blocks (A) and (B), turns out to provide a particularly efficient effect of control of the fluid: the presence of the block (A) provides anchoring of the polymer to the particles and the presence of the long block (B), which is large in size and soluble, schematically provides an effect of local increase in the viscosity of the fluid (F) around the particles.

There is thus obtained, at the surface of the particles (p), the formation of a polymer layer based on the long blocks (B) anchored to the particles using the blocks (A), the particles/polymers combination thus produced forming, so to speak, a "plug" which is sufficiently large at the porosities of the rock, which makes it possible to limit, indeed even to completely block, the phenomenon of fluid loss.

It should be noted that the use of polymers based on long blocks (B) alone would not provide control of fluid loss according to the invention, which requires anchoring of the long blocks (B) to the particles (p) via the short blocks (A), as is illustrated in the examples given at the end of the present description.

In particular, in order for this anchoring to be as effective as possible, it is preferable for the interaction between the short block (A) and the particles (p) to be as strong as possible and advantageously for this interaction to be irreversible. Preferably, the short block (A) of a polymer (P) of use according to the invention comprises:
- at least one chemical group forming at least one bond of ionic, covalent or ionocovalent type between polymer and particle; and/or
- several chemical groups each forming at least one hydrogen and/or Van der Waals bond between polymer and particle, the combination of these bonds together forming an overall bond with a force at least in the range of that of a bond of ionic, covalent or ionocovalent type.

In addition, the strong interactions between particles and polymers make it possible, if need be, to employ the polymer (P) in the presence of additives which are normally harmful to the effectiveness of the fluid loss control agents. In particular, the polymers (P) as employed according to the invention can be employed in the majority of the formulations of fluids intended to be injected into oil-bearing rocks, in particular oil cement grouts comprising additives of dispersant or set retarder type, as well as in drilling fluids and fracturing fluids.

According to a first alternative form of the invention, the injected fluid (F) comprises the polymer (P) but does not comprise solid particles (p), and it encounters said particles (p) within the subterranean formation subsequent to its injection. The association between particles and polymers then takes place in situ. Such a fluid can, for example, be injected during a drilling operation, and the rock cuttings formed during the drilling then perform the role of the particles (p) in situ.

According to a variant alternative form, the injected fluid (F) comprises, before the injection, at least a portion and generally all of the particles (p) combined with the polymer (P), it being understood that it can optionally encounter other particles (p) within the subterranean formation.

Two forms can in particular be envisaged in this context:
- form 1: the polymer (P) and the particles (p) are mixed during the formulation of the fluid (F), on the site of operation or upstream, typically by adding the particles (p), in the dry state or optionally in the dispersed state, to a composition comprising the polymer (P) in solution. According to this alternative form, the fluid (F) can, for example, be an oil cement grout, which is prepared by adding cement powder as particles (p) to an aqueous composition comprising the polymer (P) in solution.
- form 2: the fluid (F) is manufactured, advantageously on the site of operation, from a composition (premix) prepared upstream (hereinafter denoted by the term "blend") comprising the polymer (P) and at least a portion of the particles (p), generally within a dispersing liquid. In order to form the fluid (F), this blend is mixed with the other constituents of the fluid (F).

In the context of these forms 1 and 2, the polymer (P) incidentally exhibits the not insignificant advantage of improving the dispersibility and the suspending of the particles (p). In some embodiments, the polymers (P) combined with the particles (p) can be employed mainly as dispersing and stabilizing agent for the dispersion of the particles (p), at the same time providing an effect of agent for control of fluid loss.

Various specific advantages and embodiments of the invention will now be described in more detail.

Stages (E1) and (E2)

The controlled radical polymerization technique employed in stages (E1) and (E2) is a technique well known per se which makes it possible, using a control agent for the polymerization, to obtain polymers of controlled weights and in particular block polymers, both the architecture and the size of each of the blocks of which can be controlled.

Controlled radical polymerization processes which are highly suitable for the synthesis of the polymers (P) of use according to the invention are the "RAFT" or "MADIX" processes, which typically employ a reversible addition-fragmentation transfer process employing control agents (also known as reversible transfer agents), for example of xanthate type (compounds carrying —SC=SO— functional groups). Mention may in particular be made, as examples of such processes, of those described in WO 96/30421, WO 98/01478, WO 99/35178, WO 98/58974, WO 00/75207, WO 01/42312, WO 99/35177, WO 99/31144, FR 2 794 464 or WO 02/26836.

These "controlled radical polymerization" processes result, in a well-known way, in the formation of polymer chains which grow substantially all at the same rate, which is reflected by a substantially linear increase in the molecular weights with the conversion and a narrow distribution in the weights, with a number of chains which remains typically substantially fixed throughout the duration of the reaction, which makes it possible to very easily control the mean molar mass of the polymer synthesized (the monomer/control agent initial ratio defines the degree of polymerization obtained for the chains synthesized). The chains obtained furthermore generally exhibit a "living" nature: they exhibit, at the chain end, the reactive group present on the control agent. For this reason, it is possible to continue the polymerization on the polymer chain obtained, while retaining the controlled nature of the polymerization, which can in particular be used to synthesize, at the end of a first polymer block of controlled size, another block with a different composition and also of controlled size.

In each of stages (E1) and (E2), the size of the polymer block being formed is controlled by the monomer/control agent molar ratio corresponding to the initial amount of monomers with respect to the amount of control agent: schematically, all the chains grow starting from each of the control agents present and the monomers are homogeneously distributed over all the growing chains. For this reason, the monomer/control agent molar ratio dictates the degree of polymerization of the block synthesized in each of the stages and thus makes it possible to define the theoretical number-average molecular weight expected for each of the blocks.

Typically, the monomer/control agent molar ratios in stages (E1) and (E2) are chosen so that:

The theoretical number-average molecular weight of the block (A) is between 250 and 25 000 g/mol, preferably between 500 and 15 000 g/mol, in particular between 1000 and 10 000 g/mol.

The theoretical number-average molecular weight of the block (B) is between 70 000 and 5 000 000 g/mol, preferably between 80 000 and 3 000 000 g/mol, in particular between 90 000 and 2 000 000 g/mol. When the polymer is intended for a cementing operation, this theoretical number-average molecular weight of the block (B) is more preferably between 90 000 and 1 000 000 g/mol, advantageously between 100 000 and 500 000 g/mol.

The block (B) can advantageously be prepared in stage (E2) by bringing into contact:
 the ethylenically unsaturated monomers $m_B$;
 the source of free radicals which is suitable for the polymerization of said monomers; and
 the polymer prepared according to stage (E1), which acts as control agent for the radical polymerization, preferably comprising a thiocarbonylthio —S(C=S)— group and onto which the block (B) is grafted;
 the polymer $P^0$;
with a concentration of monomers within the reaction medium of stage (E2) which is sufficiently high to bring about the gelling of the medium if the polymerization were carried out in the absence of the control agent.

This polymerization technique makes it possible to access large-sized blocks (B). Advantageously, the synthesis of the block (B) can be carried out under the polymerization conditions described in the application WO 2012/042167.

Alternatively, when the block (B) is hydrophilic, the block (B) can be synthesized by bringing into contact, within an aqueous medium (M) in which the block (B) formed is not soluble:
 the ethylenically unsaturated monomers $m_B$, chosen to be soluble in the aqueous medium (M);
 the source of free radicals;
 the polymer $P^0$; and
 a reactive stabilizer which comprises:
  a polymer chain (PC) which is soluble in the medium (M),
  a group (G) providing the radical polymerization of stage (E) with a living and controlled nature, such as, for example, a group carrying a thiocarbonylthio —S(C=S)— group.

Generally, the conditions to be employed in the above-mentioned polymerization stages can be those typically employed in controlled radical polymerizations.

In particular, use may be made, in stages (E1) and (E2) of the process of the invention, of any source of free radicals known per se. For example, one of the following initiators may be concerned:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide) dihydrate, redox systems comprising combinations, such as:
mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

In particular in the case of polymerizations carried out in an aqueous medium, use may be made of a radical initiator of redox type, which exhibits the advantage of not requiring heating of the reaction medium (no thermal initiation), which makes it possible to manage even better the exothermicity of the reaction.

Thus, the source of free radicals which is employed can typically be chosen from the redox initiators conventionally used in radical polymerization, typically not requiring heating for their thermal initiation. It is typically a mixture of at least one oxidizing agent with at least one reducing agent.

The oxidizing agent present in the redox system is preferably a water-soluble agent. This oxidizing agent can, for example, be chosen from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or also potassium bromate.

The reducing agent present in the redox system is also preferably a water-soluble agent. This reducing agent can typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists of), for example, the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of stage (E) to be devoid of copper. In the case of the presence of copper, it is generally desirable to add a copper-complexing agent, such as EDTA.

The nature of the control agent employed in the stages for the synthesis of the blocks (A) and (B) can, for its part, vary to a large extent.

According to an advantageous alternative form, the control agent used is a compound carrying a thiocarbonylthio —S(C=S)— group. According to a specific embodiment, the control agent can carry several thiocarbonylthio groups.

It can optionally be a polymer chain carrying such a group. Thus, the control agent employed in stage (E2) is a living polymer resulting from stage (E1). Likewise, the control agent of stage (E1) can be envisaged as resulting from a preliminary stage (E0) in which the radical polymerization was carried out of a composition comprising:
ethylenically unsaturated monomers;
a control agent for the radical polymerization comprising at least one thiocarbonylthio —S(C=S)— group; and
an initiator of the radical polymerization (source of free radicals).

More generally, a control agent suitable for the synthesis of the polymer (P) of use according to the invention advantageously corresponds to the formula (A) below:

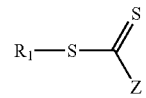

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain.

The $R_1$ or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups exhibiting a hydrophilic or ionic nature, such as alkali metal salts of carboxylic acids, alkali metal salts of sulfonic acid, polyalkylene oxide (PEO, PPO) chains, cationic substituents (quaternary ammonium salts), R representing an alkyl or aryl group, or a polymer chain.

According to a specific embodiment, $R_1$ is a substituted or unsubstituted, preferably substituted, alkyl group.

The optionally substituted alkyl, acyl, aryl, aralkyl or alkynyl groups generally exhibit from 1 to 20 carbon atoms, preferably from 1 to 12 and more preferably from 1 to 9 carbon atoms. They can be linear or branched. They can also be substituted by oxygen atoms, in particular in the form of esters, sulfur atoms or nitrogen atoms.

Mention may in particular be made, among the alkyl radicals, of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain can result from a radical or ionic polymerization or from a polycondensation.

In the context of the present invention, it is in particular advantageous to employ, as control agents, xanthates, trithiocarbonates, dithiocarbamates or dithiocarbazates.

Use is advantageously made, as control agent, of compounds carrying a xanthate —S(C=S)O— functional group, for example carrying an O-ethyl xanthate functional group of formula —S(C=S)OCH$_2$CH$_3$, such as, for example, O-ethyl S-(1-(methoxycarbonyl)ethyl) xanthate of formula (CH$_3$CH(CO$_2$CH$_3$))S(C=S)OEt.

Another possible control agent in stage (E) is dibenzyl trithiocarbonate of formula PhCH$_2$S(C=S)SCH$_2$Ph (where Ph=phenyl).

The polymer P⁰

The polymer P⁰ employed in stage (E2) of the process of the invention can vary to a very great extent, provided that it exhibits labile hydrogens allowing it to be grafted to the block B.

Thus, the polymer P⁰ employed in stage (E2) of the process of the invention can, for example, be a polymer of natural origin which is not ethylenically unsaturated chosen from:
  polysaccharides (native or modified) such as guars, celluloses or dextrans, xanthan gums, carrageenans, alginates or chitosans,
  lignites and lignosulfonates,
  humic acid,
  peptides,
  the mixtures of two or more of these polymers.

Alternatively, the polymer P⁰ used in stage (E2) can in particular be a synthetic polymer which is not ethylenically unsaturated chosen from:
  polyvinyl alcohols,
  polyesters,
  poly(lactic acid)s,
  polyamides,
  polyamines,
  poly(alkyl oxide)s, such as polyethylene glycol PEG,
  polyurethanes,
  polyacrylates,
  polyacrylamides,
  styrene/butadiene copolymers,
  poly(N-vinylpyrrolidone)s,
  the mixtures of two or more of these polymers.

In stage (E2), the polymer P⁰ is typically employed in solution. Alternatively, it can optionally be employed in aqueous dispersion.

The Fluid (F) and the Long Block (B)

The term "fluid" is understood to mean, within the meaning of the description, any homogeneous or non-homogeneous medium comprising a liquid or viscous vector which optionally transports a liquid or gelled dispersed phase and/or solid particles, said medium being overall pumpable by means of the devices for injection under pressure used in the application under consideration.

The term "liquid or viscous vector" of the fluid (F) is understood to mean the fluid itself, or else the solvent, in the case where the fluid comprises dissolved compounds, and/or the continuous phase, in the case where the fluid comprises dispersed elements (droplets of liquid or gelled dispersed phase, solid particles, and the like).

The nature of the fluid (F) and of the long block (B) of the polymers (P) used according to the present invention can vary to a fairly large extent, subject to the compatibility of the liquid or viscous vector of the fluid (F) and of the long block (B). In particular, use is made of a long block (B) of hydrophilic nature when the liquid or viscous vector present in the fluid (F) is of hydrophilic nature; conversely, when the liquid or viscous vector of the fluid (F) is hydrophobic, use is made of a long block (B) of hydrophobic nature.

The long block (B) of the polymers of use according to the invention is specifically soluble in the fluid (F). This is understood to mean that the long block (B), taken in isolation, can be dissolved in the liquid or viscous vector of the fluid (F). Preferably, the long block (B) is soluble at 25° C. and at 1% by weight in the liquid or viscous vector of the fluid (F). The notion of "solubility at 25° C." implies only that it is possible to obtain a more or less viscous, indeed even gelled, solution which, at 25° C., does not result in precipitation. This notion does not exclude the possibility of the dissolution of the block (B) involving prior heating to more than 25° C. in order to obtain this solution. In other words, the notion of "solubility at 25° C." implies the possibility of forming a solution which does not precipitate at 25° C. and not the possibility of forming, at 25° C., a solution which does not precipitate.

Furthermore, it is preferable for the long block (B) to develop the fewest possible interactions, indeed even no interactions at all, with the particles (p). Furthermore, it is preferable for the long block (B) of the polymers (P) of use according to the invention to develop fewer interactions with the particles than the short block (A).

In any case, the block (A) and the block (B) have distinct compositions. This is understood to mean that:
  the blocks (A) and (B) comprise distinct monomer units; or
  at least some of the monomers present on the block (A) are not present on the block (B); and/or at least some of the monomers present on the block (B) are not present on the block (A); or
  the block (A) and the block (B) comprise the same monomer units but in distinct proportions.

According to a highly suitable embodiment, the fluid (F) is an aqueous fluid. The term "aqueous" is understood here to mean that the fluid comprises water as liquid or viscous vector, either as sole constituent of the liquid or viscous vector or in combination with other water-soluble solvents.

In the case of the presence of solvents other than water in the liquid or viscous vector of the fluid (F), the water advantageously remains the predominant solvent within the liquid or viscous vector, advantageously present in a proportion of at least 50% by weight, indeed even of at least 75% by weight, with respect to the total weight of the solvents in the liquid or viscous vector.

When the fluid (F) is an aqueous fluid, the block (B) is advantageously a block of hydrophilic nature. The term "block of hydrophilic nature" is understood here to mean a polymer block which, in the isolated state, is soluble in pure water in a proportion of 1% by weight at 25° C. (it being possible for the dissolution to optionally involve heating), forming a more or less viscous, indeed even gelled, solution but without formation of precipitate at 25° C.

Advantageously, the block (B) of hydrophilic nature employed when the fluid (F) is an aqueous fluid is at least predominantly composed of monomer units selected from the group consisting of the monomer units U1 to U5 defined below, and the mixtures of these monomer units:

monomer units U1: monomer units comprising an acrylamide, in particular dimethylacrylamide (DMA), or else (meth)acrylamide, morpholine N-oxide acrylamide or diacetone acrylamide functional group; the block (B) advantageously comprises monomer units of this type.

monomer units U2: monomer units comprising a sulfonic acid or sulfonate functional group, including in particular the 3-sulfopropyl (meth)acrylate, 2-propene-1-sulfonic acid, sodium 1-allyloxy-2 hydroxypropylsulfonate (COPS1), in particular 2-acrylamido-2-methylpropanesulfonic acid (AMPS), (meth)allyl sulfonate, sodium vinylsulfonate, sodium styrenesulfonate, (3-sulfopropyl)dimethyl(3-methacrylamidopropyl)ammonium, N-(2-methacryloyloxyethyl)-N,N-dimethyl-N-(3-sulfopropyl)ammonium betaine or N-(2-1-(3-sulfopropyl)-2-vinylpyridinium betaine units.

monomer units U3: neutral monomer units including, inter alia:

esters of α,β-ethylenically unsaturated mono- or dicarboxylic acids with $C_2$-$C_{30}$ alkanediols or polyethylene glycols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, N-(hydroxymethyl)acrylamide, N-(2-hydroxypropyl)methacrylamide, N-hydroxyethylacrylamide, N-[tris(hydroxymethyl)methacrylamide, 4-acryloylmorpholine, 2-(N-morpholino)ethyl methacrylate, polyethylene glycol meth(acrylate), diethylene glycol (meth)acrylate, ethylene glycol methyl ether (meth)acrylate, 2-hydroxyethyl acrylate, hydroxypropyl acrylate, poly(propylene glycol) acrylate, 2-chloroethyl acrylate, tetrahydrofurfuryl acrylate, vinylacetamide, vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam.

monomer units U4: monomer units carrying ammonium groups, in particular esters of α,β-ethylenically unsaturated mono- or dicarboxylic acids with aminoalcohols, such as N,N-dimethylaminomethyl (meth)acrylate, N,N-dimethylaminoethyl (meth)acrylate, N,N-diethylaminoethyl acrylate, N,N-dimethylaminopropyl (meth)acrylate, N,N-diethylaminopropyl (meth)acrylate and N,N-dimethylaminocyclohexyl (meth)acrylate;

amides of α,β-ethylenically unsaturated mono- or dicarboxylic acids with diamines having at least one primary or secondary amine group, such as N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide or N-[4-(dimethylamino)cyclohexyl]methacrylamide;

N,N-diallylamines and N,N-diallyl-N-alkylamines, including in particular (3-sulfopropyl)dimethyl(3-methacrylamidopropyl)ammonium, N-(2-methacryloyloxyethyl)-N,N-dimethyl-N-(3-sulfopropyl)ammonium betaine, N-(2-1-(3-sulfopropyl)-2-vinylpyridinium betaine and N-(2-1-(3-sulfopropyl)-4-vinylpyridinium betaine.

monomer units U5: acrylate monomer units carrying a COOH or COO— group, including in particular acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid or monoethylenically unsaturated $C_4$-$C_{10}$ and preferably $C_4$ to $C_6$ dicarboxylic acid monoesters, such as monomethyl maleate. According to one possible embodiment, the block (B) of hydrophilic nature employed when the fluid (F) is an aqueous fluid is composed essentially, indeed even exclusively, of monomer units of the abovementioned type, where, in the abovementioned units, the acid groups can be, in all or part, in the free acid form and/or in the salt form, for example potassium, sodium or ammonium salt form (neutralized form).

As employed in the present description, the expression "polymer or polymer block at least predominantly composed of monomer units 'x'" denotes a homopolymer or copolymer (block) resulting from the polymerization of a mixture of monomers, including monomers 'x', this homopolymer or copolymer (block) comprising less than 25 mol %, preferably less than 15 mol % and more advantageously still less than 10 mol % of monomer units other than the units 'x'.

The expression "polymer or polymer block essentially composed of monomer units 'x'" for its part denotes, within the meaning of the present description, a homopolymer or copolymer (block) at least predominantly composed of monomer units 'x' of the abovementioned type, more specifically comprising less than 5 mol %, preferably less than 2 mol % and more advantageously still less than 1 mol % of monomer units other than the units 'x'.

According to a specific embodiment compatible with the preceding embodiments, the block (B) of hydrophilic nature employed when the fluid (F) is an aqueous fluid can comprise hydrophobic monomers in small proportions, typically in a proportion of at least 0.05%, in particularly at least 0.1%, indeed even at least 0.5%, if appropriate; this content of hydrophobic monomers preferably remaining below 10%, for example below 5%, in particular below 3%, indeed even 2%, these percentages being expressed by weight with respect to the total weight of the monomer units in the block (B). When hydrophobic monomers of this type are present, they can typically (but nonlimitingly) be chosen from alkyl acrylates (such as methyl acrylate), styrene, alkyl methacrylates and/or vinyl acetate.

The long block (B) present in the polymers employed according to the present invention furthermore has a weight sufficiently great to provide the desired effect of controlling fluid loss. To this end, the block (B) typically has a weight-average molecular weight of greater than 100 000 g/mol, preferably of greater than 150 000 g/mol, for example of greater than 200 000 g/mol, in particular of greater than 250 000 g/mol, this being the case in particular when the block (B) is of one of the abovementioned types. In practice, this weight-average molecular weight generally remains below 3 000 000 g/mol (and typically between 150 000 and 2 000 000 g/mol) but higher weights can be envisaged in the absolute, except in the specific case of a fluid (F) used in the context of a cementing operation, where it is preferable for the weight-average molecular weight of the long block (B) to remain below 1 000 000 g/mol and advantageously below 800 000 g/mol.

In the context of the present invention, it has furthermore been demonstrated that, surprisingly, the desired effect of controlling fluid loss is obtained for blocks (B) having a lower weight-average molecular weight than 100 000 g/mol. Thus, according to a specific embodiment, the block (B) has a weight-average molecular weight of between 10 000 and 100 000 g/mol, preferably of at least 20 000 g/mol, for example of at least 25 000 g/mol, it being possible for this weight-average molecular weight to be typically less than 90 000, for example less than 75 000, indeed even less than 50 000.

An estimation of the weight-average molecular weight of the long block (B) can be measured by size exclusion chromatography and measurement of weight using external calibration with polyethylene oxide standards (relative SEC), which results in a slightly increased value of the weight-average molecular weight denoted in the present description by Mw(relative SEC).

This Mw(relative SEC) is typically measured under the following conditions:
  Mobile phase: Mixture of 80% by weight of deionized water, additivated with 0.1M $NaNO_3$, and 20% by weight of acetonitrile
  Flow rate: 1 ml/min
  Columns: Shodex OHpak SB 806 MHQ (3×30 cm columns)
  Detection: Refractive index (Agilent concentration detector)
  Concentration of the samples: approximately 0.5% by weight of solids in the mobile phase
  Injection: 100 µl
  Internal reference: ethylene glycol
  Calibration: polyethylene oxide PEO The Mw(relative SEC) of the long block (B) of the polymers (P) of use according to the invention is generally greater than or equal to 125 000 g/mol, preferably greater than or equal to 150 000 g/mol, this Mw(relative SEC) typically being between 200 000 and 2 500 000 g/mol, in particular between 250 000 and 2 000 000 g/mol. According to a more specific embodiment, it can be less than 125 000 g/mol, for example between 12 500 and 100 000 g/mol.

In the case of a fluid (F) used in the context of a cementing operation, the Mw(relative SEC) of the long block (B) of the polymers (P) is typically (but nonlimitingly) between 25 000 and 900 000 g/mol, for example between 250 000 and 900 000 g/mol.

In practice, the Mw(relative SEC) of the polymer (P) is measured, which, as a result of the low weight of the block (A), also represents a fairly good approximation, inflated, of the weight-average molecular weight of the block (B). The Mw(relative SEC) of the polymer (P) is generally greater than or equal to 15 000 g/mol, and for example greater than or equal to 150 000 g/mol, preferably greater than or equal to 200 000 g/mol, for example greater than or equal to 300 000 g/mol, in particular greater than or equal to 400 000 g/mol, this Mw(relative SEC) of the polymer (P) typically being between 200 000 g/mol and 2 500 000 g/mol, in particular between 250 000 g/mol and 2 000 000 g/mol. It is more particularly between 25 000 and 900 000 g/mol, for example between 250 000 and 800 000 g/mol, in the case of a fluid (F) used in the context of a cementing operation.

In the specific case where the fluid (F) is used in a cementing operation (oil cement grout, typically):
  the block (B) is advantageously a block of hydrophilic nature, preferably comprising units U1 of the abovementioned type, in particular dimethylacrylamide DMA units, optionally but not necessarily in combination with units U2, in particular acrylamidomethylpropanesulfonic acid (AMPS) units, optionally in all or part in the sulfonate form, for example in the form of its sodium salt.
  According to a specific embodiment, the block (B) is at least predominantly (for example essentially, indeed even exclusively) composed of a mixture of DMA and AMPS units, with a DMA/AMPS molar ratio for example of between 60/40 and 90/10, in particular between 75/25 and 85/15 and typically of the order of 80/20.
  the block (B) typically has a weight-average molecular weight of between 150 000 and 750 000 g/mol, preferably between 200 000 and 700 000 g/mol. Alternatively, the block (B) can have a weight-average molecular weight of between 15 000 and 150 000 g/mol, preferably between 20 000 and 100 000 g/mol.
  the block (B) typically has a Mw(relative GPC) of between 200 000 and 800 000 g/mol, preferably between 250 000 and 900 000 g/mol, for example from 300 000 to 600 000 g/mol, the polymer (P) generally having a Mw(relative SEC) within these ranges. The block (B) can alternatively have a Mw(relative GPC) of between 20 000 and 200 000 g/mol, preferably between 25 000 and 180 000 g/mol, for example 30 000 and 150 000 g/mol, the polymer (P) generally having a Mw(relative SEC) within these ranges.

The long block (B) employed when the fluid (F) is an oil cement grout is typically a random DMA/AMPS block with a DMA/AMPS molar ratio between 75/25 and 85/15 (typically of the order of 80/20) and a Mw(GPC-MALS) of between 20 000 and 7500 000 g/mol, in particular between 200 000 and 750 0000, for example between 400 000 and 600 000.

The Particles (p) and the Short Block (A)

The notion of "particle" within the meaning under which it is employed in the present description is not confined to that of individual particles. It more generally denotes solid entities which can be dispersed within a fluid, in the form of objects (individual particles, aggregates, and the like) for which all the dimensions are less than 5 mm, preferably less than 2 mm, for example less than 1 mm.

The nature of the particles (p) and of the short block (A) of the polymers (P) used according to the present invention can vary to a fairly large extent, provided that the block (A) interacts with the particles (p) and results in an immobilization, preferably irreversible, of the polymer (P) on the surface of the particles (p).

To do this, the block (A) generally comprises monomer units carrying groups which develop, with the particles (p), stronger interactions than the long block (B).

According to a highly suitable embodiment, the particles (p) are inorganic particles introduced within the fluid (F) or with which the fluid (F) comes into contact subsequent to its injection. These particles (p) are then typically cement, calcium carbonate, clay, baryte, silica, sand or carbon black particles. According to this embodiment, the block (A) is preferably at least predominantly (and preferably essentially, indeed even exclusively) composed of monomer units chosen from the preferred groups defined hereinafter, to be adjusted on an individual basis as a function of the nature of the particles (p):

for particles (p) of calcium carbonate or cement:
the block (A) can in particular be at least predominantly (and preferably essentially, indeed even exclusively) composed of:
monomer units U5 of the abovementioned type, advantageously present in the block (A); and/or
monomer units U3 of the abovementioned type; and/or
monomer units U6 carrying phosphate, phosphonate or phosphinate groups (in the free acid form and/or in the saline form), such as, for example, monoacryloyloxyethyl phosphate or bis(2-methacryloyloxyethyl) phosphate units, the monomer units introduced by employing Sipomer PAM 100, 200, 400 or 5000 available from Solvay, vinylphosphonic acid, allylphosphonic acid, isopropylphosphonic acid, diallyl aminomethylene phosphonate and their salts.
The block (B) is then typically at least predominantly (and preferably essentially, indeed even exclusively) composed of units U1 and/or U2 of the abovementioned type.

for particles (p) of silica or sand:
the block (A) can in particular be at least predominantly (and preferably essentially, indeed even exclusively) composed of:
monomer units U3 of the abovementioned type; and/or
monomer units U4 of the abovementioned type; and/or
monomer units U7 which are (meth)acrylate units functionalized by polydimethylsiloxanes, such as trimethylsiloxy-terminated PEG 4-5 methacrylate or 3-(trimethoxysilyl)propyl methacrylate.
The block (B) is then typically at least predominantly (and preferably essentially, indeed even exclusively) composed of units U1 and/or U2 and/or U5 of the abovementioned type.

for particles (p) of clay:
the block (A) can in particular be at least predominantly (and preferably essentially, indeed even exclusively) composed of:
monomer units U4 of the abovementioned type; and/or
monomer units U6 of the abovementioned type.
The block (B) is then typically at least predominantly (and preferably essentially, indeed even exclusively) composed of units U1 and/or U2 of the abovementioned type.

for particles (p) of carbon black:
the block (A) can in particular be at least predominantly (and preferably essentially, indeed even exclusively) composed of hydrophobic units U8, including in particular:
esters of $\alpha,\beta$-ethylenically unsaturated mono- or dicarboxylic acids with $C_1$-$C_{20}$ alcohols, such as, for example, methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate, mono-, di- or tristyrylphenyl (meth)acrylates optionally ethoxylated between the aromatic and methacrylate groups; and/or
vinylaromatic monomer units, such as styrene, 2-methylstyrene, 4-methylstyrene, 2-(n-butyl)styrene, 4-(n-butyl)styrene or 4-(n-decyl)styrene;
fluorinated monomer units, such as perfluorinated or highly fluorinated alkyl (meth)acrylates;
The cationic units corresponding to the abovementioned monomer units U4. The block (B) is then typically at least predominantly (and preferably essentially, indeed even exclusively) composed of units U1 and/or U2 and/or U5 of the abovementioned type.

Whatever its chemical nature, the short block (A) present in the polymers employed according to the present invention generally has a weight-average molecular weight between 500 and 30 000 g/mol, for example between 1000 and 25 000 g/mol, this being the case in particular when the block (A) is of one of the abovementioned types.

According to a particularly advantageous embodiment, employed when the particles (p) are particles of cement or calcium carbonate, the short block (A) is a poly(acrylic acid) homopolymer block with a weight-average molecular weight ranging from 1000 to 20 000 g/mol.

The weight-average molecular weight of the short block (A) can in particular be measured by gel permeation chromatography, followed by a multi-angle light scattering analysis (GPC-MALS).

The Polymers (P)

The polymers of use according to the present invention are specific polymers which comprise at least two blocks of very different size, including a large-sized block (B).

The polymers (P) of use according to the invention generally comprise only the blocks (B) and (A). They are typically diblock polymers (A)-(B) but polymers comprising more blocks can be envisaged, in particular copolymers comprising a long block (B) onto which two or more short blocks are grafted (triblock polymers of (A)-(B)-(A) type in particular), or else copolymers comprising a spacer block between the block (B) and the block (A).

Some of the polymers of use according to the present invention are polymers which, to the knowledge of the inventors, have never been described previously.

These polymers comprise in particular the block polymers containing, preferably as sole blocks:
- at least one first block pAA at least predominantly (and preferably essentially, indeed even exclusively) composed of acrylic acid units, with a weight-average molecular weight between 500 and 30 000 g/mol, in particular between 1000 and 20 000; and
- a second block p(DMA/AMPS) at least predominantly (and preferably essentially, indeed even exclusively) composed of a random mixture of DMA and AMPS units, with a DMA/AMPS molar ratio of between 60/40 and 90/10 and with a weight-average molecular weight of greater than 150 000 g/mol, typically between 200 000 and 2 000 000 g/mol and in particular between 250 000 and 750 000 g/mol.

These polymers constitute a specific subject matter of the present invention, and also
- the oil cement grouts comprising them,
- the aqueous fluids for injection under pressure within an oil-bearing rock, in particular drilling fluids and fracturing fluids, comprising them in combination with inorganic particles, and also the blends for the preparation of these fluids.

Practical Applications

The polymers of use according to the invention can be employed in virtually all of the fluids used in oil extraction and potentially subject to fluid loss.

According to a specific embodiment of the invention, the fluid (F) is an oil cement grout which comprises the polymer (P) as additive. In this case, the polymer (P), combined with the particles present in the cement, provides the effect of control of fluid loss during the cementing.

According to another embodiment, the fluid (F) is a drilling fluid or a fracturing fluid which comprises the polymer (P) combined with particles (p). The particles (p) are then generally introduced jointly with the polymer into the fluid (F) before the injection of the fluid. The polymer then generally provides stabilization of the dispersion of the particles in the fluid (F) by keeping at least a portion of the particles (p) in suspension in the fluid.

The concentrations of polymer and particles to be employed in these various fluids can be adjusted individually as a function of the application targeted and of the rheology desired.

Various aspects and advantages of the invention will be further illustrated by the example below, in which polymers were prepared according to the process of the invention.

EXAMPLES

Example 1

Polymer Known as "NaAMPS/$_N$, $_N$-DMA/AS/AM/ Caustized Lignite/PAA-Xa Hybrid"

1.1: Synthesis of a Poly(Acrylic Acid) Block Having a Xanthate Ending (PAA-Xa)

30 g of acrylic acid in an aqueous solvent; a mixture of 35 g of distilled water and 28 g of ethanol, 6.24 g of 0-ethyl S-(1-(methoxycarbonyl)ethyl) xanthate of formula (CH$_3$CH(CO$_2$CH$_3$))S(C=S)OEt and 312 mg of 2,2'-azobis(2-methylpropionamidine) dihydrochloride were introduced into a 250 ml round-bottomed flask at ambient temperature. The mixture was degassed by bubbling with nitrogen for 20 minutes.

The round-bottomed flask was subsequently placed in an oil bath thermostatically controlled at 60° C. and the reaction medium was left stirring at 60° C. for 4 hours.

On conclusion of these four hours, the conversion was determined by $^1$H NMR.

An analysis by size exclusion chromatography in a mixture of water and acetonitrile (80/20) additivated with NaNO$_3$ (0.1N) with an 18-angle MALS detector provides the weight-average molar mass ($M_w$) and polydispersity index ($M_w/M_n$) values given in table 1 below.

| Block synthesized | $M_n$, th | Xanthate (g) | Conversion ($^1$H NMR) | $M_w$ (g/mol) | $M_w/M_n$ |
|---|---|---|---|---|---|
| A1 | 1000 | 6.24 | >99.9% | 2100 | 1.8 |

1.2: Synthesis of the Polymer 384.6 g of demineralized water and 3.81 g of SYN-320E (silicone antifoaming agent) were introduced into a 1 l jacketed reactor. The mixture was stirred using a magnetic bar, then 33.9 g of Super Treat lignite treated with sodium hydroxide were added and stirring was allowed to continue for 15 min.

While maintaining stirring, the following compounds were introduced:
- acrylamide (68.2 g of a 50% solution in water),
- NaAMPS (sodium salt of 2-acrylamido-2-methylpropanesulfonic acid) (156.2 g of a 50% solution in water),
- N,N-dimethylacrylamide (32.28 g),
- sodium allylsulfonate (7.34 g of a 35% solution in water),
- Versene 100 (0.194 g),
- demineralized water (6.78 g),
- PAA-Xa prepared in stage 1.1 (7.50 g of a 47.9% solution in water).

The pH of the solution was adjusted to between 8.7 and 9.5 with a 25% NaOH solution (3.53 g).

The reaction mixture was heated to 50° C. and degassed by bubbling with nitrogen for 30 min while stirring; at the end of these 30 min, a nitrogen headspace was maintained in the reactor with a reduced flow rate of 1 scfh.

A sodium persulfate solution (2.65 g of sodium persulfate in 7.92 g of demineralized water) was subsequently injected using a syringe and stirring was allowed to take place for 1 min before introducing a sodium metabisulfite solution (0.95 g of sodium metabisulfite in 3.74 g of demineralized water). The reaction medium was stirred for 10 min, after observation of the end of the polymerization exothermicity.

A second injection of initiators (sodium persulfate and sodium metabisulfite) was then carried out using the same addition protocol as for the first injection (0.839 g of sodium persulfate in 2.5 g of demineralized water/0.95 g of sodium metabisulfite in 3.74 g of demineralized water). The reaction medium was stirred for 10 min.

After observation of the end of the polymerization exothermicity, a third injection of initiators was carried out using the same protocol as above (0.56 g of sodium persulfate in 1.66 g of demineralized water/0.69 g of sodium metabisulfite in 2.71 g of demineralized water). Stirring was continued for 30 min after observation of the end of polymerization exothermicity and the nitrogen flow was cut off.

1.3. Performances

The performances in terms of fluid loss control were evaluated using class H cement with a density of 3.18 g/cm$^3$. The formulation and the filtration test were carried out according to the standard of the American Petroleum Institute (API recommended practice for testing well cements 10B, 2nd edition, April 2013).

The polymer to be tested (36.0 g) and demineralized water (256.1 g) were introduced into a mixer and were mixed at low speed, until a homogeneous mixture was obtained.

While using a moderate rotational speed, an intimate mixture of the following solid additives (intimately mixed beforehand in a flask) was introduced into the mixer:
  class H cement (600 g),
  silica fume (210 g),
  setting retarder of lignosulfonate type (9.0 g).

2 ml of Syn-320E were subsequently added to the mixer and then vigorous stirring was applied until an unchanging vortex was obtained, i.e. up to approximately 60 seconds after the end of the introduction of the solids and Syn-320E.

The appliance used to measure the fluid loss is the model 7120 from Chandler Engineering. The cement grout prepared in the mixer was poured into the cell of the Chandler appliance. The cell was closed and pressurized at 500 psi (35 bar) in order to condition the cement at a temperature of 176° C. Stirring was maintained in the cell throughout the duration of the conditioning. When the temperature of the product reached 176° C., the stirrer motor was switched off, the cell was inverted and the pressure of the main cylinder was increased to 1125 psi. The back pressure of the fluid loss collector was adjusted to 125 psi, so as to ensure filtration with a pressure difference of 1000 psi. The valve at the bottom of the appliance was subsequently opened. The fluid loss volume recovered was measured every 2 min for 30 min.

After filtration for 30 min, the total volume collected was measured. This volume, multiplied by two, corresponds to the fluid loss according to the standard API 10B:
  the FLV (fluid loss volume) for the polymer tested is 20 ml at 176° C.

Example 2

Poly(Acrylic Acid)-b-Poly(N,N-Dimethylacrylamide-Co-AMPS) Diblock Copolymers Grafted with PVA (Polyvinyl Alcohol)

1.1: Synthesis of a Poly(Acrylic Acid) Block Having a Xanthate Ending

The synthesis was carried out at the laboratory scale in a glass reactor equipped with a mechanical stirrer, a system for heating/cooling and for efficient temperature regulation and with a system for reflux/condensation of the vapors.

The composition of initial charges of the reactants and solvents (acrylic acid AA, xanthate, water, ethanol and V50) placed in the reactor is given in table 1.

O-ethyl S-(1-{methoxycarbonyl}ethyl) xanthate (Rhodixan A1) of formula $(CH_3CH(CO_2CH_3))S(C=S)OEt$ was used as MADIX transfer agent. The amount shown in table 1 corresponds to the value of the theoretical number-average molecular weight expected (Mn, th=1 kg/mol), calculated by the ratio of the amount of monomer to the amount of xanthate.

Sparging of the reaction mixture with nitrogen was used throughout the synthesis.

The solution of the monomer in water and the solution of the initiator V-50 (2,2'-azobis(2-methylpropionamidine)dihydrochloride) in water were introduced into the reactor separately, in a semicontinuous manner, over predetermined periods and while retaining an unchanging temperature of 60° C.+/−2 (see table 1 with charges and reaction conditions).

The general synthesis procedure is as follows:
  Solutions of initiator and of the monomer in water are prepared and are placed in feed vessels; subsequently, feed lines of the reactor are filled with these solutions.
  Sparging of the reactor with nitrogen is begun. Sparging is maintained throughout the reaction.
  The demineralized water, the ethanol, the acrylic acid (first part), the Rhodixan A1 and the initiator V50 (first part) are charged to the reactor.
  Stirring is begun at 150 rpm.
  The reactor is heated to 60° C.
  At a temperature of 60° C. (+/−2), cofeeding of the initiator solution semicontinuously with separate feeding of the monomer solution are begun.
    Appropriate amounts of the initiator solution (2) are provided with the passing of the appropriate time (see table of reaction conditions for a specific example).
    Starting from the same time, appropriate amounts of the monomer solution are provided in the appropriate time (see table 1 below of the reaction conditions).
  After the end of two semicontinuous feeding operations, heating is maintained at 60° C. for 3 hours.
  The product is cooled to a temperature <40° C. and the product is discharged for analyses.

According to this procedure, polyacrylic acid functionalized by the xanthate group was synthesized with a number-average molecular weight targeted at 1000 g/mol.

TABLE 1

Conditions of the synthesis of living poly(acrylic acid) block having a xanthate ending

| Reference | Theoretical Mn targeted g/mol | Initial charges of the reactants in the reactor | | | | | AA solution to be introduced semicontinuously | | V50 solution (2) to be introduced semicontinuously | |
|---|---|---|---|---|---|---|---|---|---|---|
| | | Water (grams) | Ethanol (grams) | AA (grams) | Xanthate (grams) | V50 (1) (grams) | 38.7% AA in water (grams) | Duration of introduction (minutes) | 10% V50 in water (grams) | Duration of introduction (minutes) |
| A1 | 1000 | 14.5 | 21.7 | 5.0 | 10.4 | 0.11 | 116.3 | 180 | 6.80 | 240 |

The conversions of monomer and of Rhodixan A1 were determined by $^1$H NMR.

An analysis by size exclusion chromatography in a mixture of water and of acetonitrile (80/20) additivated with NaNO$_3$ (0.1N) with an eighteen-angle MALS detector provided the values of weight-average molar mass ($M_w$) and of polydispersity index ($M_w/M_n$) given in table 2 below.

TABLE 2

| Block synthesized | $M_n$, th | Xanthate conversion (g) | AA conversion ($^1$H NMR) | $M_w$ (g/mol) | $M_w/M_n$ |
|---|---|---|---|---|---|
| A1 | 1000 | >99.5% | >99.5% | 1800 | 1.4 |

2.2: Synthesis of Diblock Copolymers Grated with PVA Starting from the Block A1

Polymers P1 to P3

The block A1 prepared as indicated in section 1.1 was employed in its reaction medium obtained, without purification, with a weight of polymer block A1 as given in table 3 below.

The synthesis was carried out at the laboratory scale in a glass reactor equipped with a mechanical stirrer, with a system for heating/cooling and for efficient regulation of temperature and with a system for reflux/condensation of the vapors.

The composition of initial charges of the reactants and the solvents (first block A1, 2-acrylamido-2-methylpropanesulfonic acid sodium salt—AMPS(Na), dimethylacrylamide—DMAM, water, ammonium persulfate—APS, hydroxymethanesulfinic acid monosodium salt dihydrate—NaFS) placed in the reactor is given in table 3. The pH of the reaction mixture placed in the reactor as initial charge was adjusted to pH=2.2+/−0.2 with 10% HCl in water.

The block A1 was used as MADIX transfer agent. The amount shown in table 3 corresponds to the value of the theoretical number-average molecular weight expected for the second block (Mn, th=200 kg/mol), calculated by the ratio of the amount of monomers to the amount of blocks A1.

Sparging the reaction mixture with nitrogen was used throughout the synthesis.

The solution of the mixture of the monomers (AMPS(Na) and DMAM) in water, the solution of the reducing agent (NaFS) and the solution of the polyvinyl alcohol (PVA) in water were introduced into the reactor separately, in a semicontinuous manner, over predetermined periods and while retaining an unchanging temperature of 40° C.+/−2 (see table 3 with reaction conditions and charges).

The general synthesis procedure is as follows:

Solutions of reducing agent, of the monomers and of the polyvinyl alcohol PVA in water are prepared and are placed in feed vessels; subsequently, feed lines for the reactor are filled with these solutions.

Sparging of the reactor with nitrogen is begun. Sparging is maintained throughout the reaction.

The demineralized water, block A1, AMPS(Na) (first part), DMAM (first part), the initiator APS and reducing agent NaFS (first part) are charged to the reactor.

Stirring is begun at 150 rpm.

The reactor is heated to 40° C.

At a temperature of 40° C. (+/−2), the time is marked as T0 and cofeeding of the solution of reducing agent (2) semicontinuously with separate feeding of the solution of the monomers are begun.

Appropriate amounts of the solution of reducing agent (2) are provided with the passing of the appropriate time (see table of the reaction conditions for a specific example).

Starting from the same time, appropriate amounts of the solution of the monomers are provided in the appropriate time (see table 1 of the reaction conditions).

At time T0+15 minutes or T0+60 minutes (see table 3 for each specific diblock), semicontinuous feeding of the PVA solution is begun for 60 minutes.

After the end of all the semicontinuous feeding operations, heating is maintained at 40° C. for 3 hours.

The product is cooled to <30° C. and the product is discharged for analyses.

According to this procedure, poly(acrylic acid)-b-poly(N,N-dimethylacrylamide-co-AMPSNa) diblock copolymers grafted with PVA (polyvinyl alcohol) were synthesized with a number-average molecular weight targeted at 200 000 g/mol.

The specific charges of the reactants and the reaction conditions are given in tables 3a and 3b below.

TABLE 3 a

| | | Initial charges of the reactants in the reactor | | | | | | Solution of the monomers to be introduced semicontinuously | | | |
|---|---|---|---|---|---|---|---|---|---|---|---|
| Reference | Theoretical Mn targeted g/mol | Water (grams) | 50% AMPS(Na) in water (grams) | DMAM (grams) | Block A1 (grams) | APS (grams) | NaFS (1) (grams) | DMAM (grams) | AMPS(Na) (50% in water) (grams) | Water (grams) | Duration of introduction (minutes) |
| P1 | 200 000 | 80.6 | 3.65 | 3.15 | 0.47 | 0.025 | 0.0002 | 17.87 | 20.66 | 20.15 | 120 |
| P2 | 200 000 | 61.7 | 3.65 | 3.15 | 0.47 | 0.025 | 0.0002 | 17.87 | 20.66 | 15.42 | 120 |
| P3 | 200 000 | 61.7 | 3.65 | 3.15 | 0.47 | 0.025 | 0.0002 | 17.87 | 20.66 | 15.42 | 120 |

TABLE 3b

| Reference | Theoretical Mn targeted g/mol | PVA solution to be introduced semicontinuously | | | | Solution of NaFS (2) to be introduced semicontinuously | |
|---|---|---|---|---|---|---|---|
| | | PVA grade | PVA (grams) | Water (grams) | Start of introduction at | 0.25% NaFS in water (grams) | Duration of introduction (minutes) |
| P1 | 200 000 | Celvol PVA 502 | 8.30 | 50.9 | T0 + 15 minutes | 1.90 | 300 |
| P2 | 200 000 | Celvol PVA 523 | 8.30 | 74.6 | T0 + 15 minutes | 1.90 | 300 |
| P3 | 200 000 | Celvol PVA 523 | 8.30 | 74.6 | T0 + 60 minutes | 1.90 | 300 |

Tables 3a and 3b: Conditions of the synthesis of diblocks grafted with PVA

The conversion of the monomers was calculated by $^1$H NMR analysis (results in table 4 below).

The viscosity of the solution of the polymer was measured at 25° C. (Brookfield, speed 20 rpm, RV element #3). Analytical results are given in table 4 below.

TABLE 4

Polymers P1 to P3

| Polymer | Short block | Conversion DMA | Conversion AMPS | Viscosity (cP) | Solids content (%) |
|---|---|---|---|---|---|
| P1 | A1 | >99.5 | >99.5 | 1280 | 20.0 |
| P2 | A1 | >99.5 | >99.5 | 1220 | 19.5 |
| P3 | A1 | >99.5 | >99.5 | 1410 | 20.5 |

2.2: Evaluation of the Diblock Polymers in Cement Grouts

The diblock polymers P1 to P3 prepared in the examples were used to prepare oil cement grouts having the following formulation:

Municipal water: 334.4 g

Diblock polymer (at 20% in aqueous solution): 19.5 g

Organic antifoaming agent: 2.1 g

Dykheroff black label cement (API Class G): 781.5 g

The fluid loss control agent is mixed with the liquid additives and with the municipal water before incorporation of the cement.

The formulation and the filtration test were carried out according to the standard of the American Petroleum Institute (API recommended practice for testing well cements, 10B, 2nd edition, April 2013).

After mixing and dispersing all the constituents of the formulation, the grout obtained was conditioned at 88° C. for 20 minutes in an atmospheric consistometer (model 1250 supplied by Chandler Engineering Inc.), prestabilized at this temperature, which makes it possible to simulate the conditions experienced by the cement grout during descent in a well.

The fluid loss control performance was determined by a static filtration at 88° C. in a double-ended cell with a capacity of 175 ml equipped with a 325 mesh×60 mesh metal screen (supplied by Ofite Inc., reference 170-45). The performance levels of the polymers in the cement formulations are given in table 5 below:

TABLE 5 performance levels

| Polymer tested | API vol (ml) |
|---|---|
| P1 | 42 |
| P2 | 42 |
| P3 | 38 |

The invention claimed is:

1. A process for the preparation of a block copolymer P comprising a first block (A) bonded to a second block (B), the process comprising the following controlled radical polymerization stages:
(E1) bringing the following into contact:
ethylenically unsaturated monomers $m_A$, which are identical or different, chosen for the construction of the block (A);
a source of free radicals which is suitable for the polymerization of said monomers $m_A$; and
a control agent for the radical polymerization;
then
(E2) bringing the following into contact:
the polymer obtained on conclusion of stage (E1), which acts as control agent for the radical polymerization;
ethylenically unsaturated monomers $m_B$, which are identical or different, chosen for the construction of the block (B);
a source of free radicals which is suitable for the polymerization of said monomers $m_B$; and
a polymer $P^0$ which is not ethylenically unsaturated and which carries labile hydrogens.

2. The process as claimed in claim 1, wherein the polymer $P^0$ used in stage (E2) is a natural polymer which is not ethylenically unsaturated selected from the group consisting of:
native or modified polysaccharides,
lignites and lignosulfonates,
alginates,
gelatins,
carrageenans,
agars,
humic acid,
peptides,
proteins, and
the mixtures of these polymers.

3. The process as claimed in claim 1, wherein the polymer $P^0$ used in stage (E2) is a natural polymer which is not ethylenically unsaturated selected from the group consisting of:
PVAs,
polyesters,
poly(lactic acid)s, polyamides,
polyacrylates,
polyacrylamides,
polyamines,
poly(alkyl oxide)s,
polyurethanes,
styrene/butadiene copolymers,
poly(N-vinylpyrrolidone)s, and
the mixtures of two or more of these polymers.

4. A block polymer obtained according to the process of claim 1.

5. A fluid (F) for injecting under pressure into a subterranean formation, comprising a fluid loss control agent, wherein the fluid loss control agent is the block polymer (P) according to claim 4 comprising:
the first block (A), a block known as "short block", with a weight-average molecular weight of less than 30 000 g/mol; and
the second block (B), also known as "long block", with a composition distinct from that of said first block and with a weight-average molecular weight of greater than 10 000 g/mol and which incorporates at least a portion of the polymer $P^0$ and which is soluble in the fluid (F).

6. The fluid claimed in claim 5, wherein the fluid (F) comprises particles (p) combined with the polymer (P), the polymer being advantageously employed as dispersing and stabilizing agent for the dispersion of the particles (p).

7. The fluid claimed in claim 5, wherein the fluid (F) does not comprise solid particles (p).

8. The process according to claim 1, wherein stage (E1) is in aqueous medium.

9. The process according to claim 1, wherein the control agent for the radical polymerization in (E1) comprises a thiocarbonylthio $S(C=S)$— group.

10. The process according to claim 2, wherein the native or modified polysaccharides are guars, celluloses, dextrans, chitosans, xanthans, rheozans or pectins.

11. The process according to claim 3, wherein the poly (alkyl oxide) is polyethylene glycol.

12. The fluid of claim 5, wherein the weight-average molecular weight of the second block (B) is greater than 100 000 g/mol.

* * * * *